United States Patent [19]
Huber

[11] 3,747,996
[45] July 24, 1973

[54] TRACK SECTION AND ENDLESS TRACK USING SAME

[75] Inventor: Walter E. Huber, Springfield, Mo.

[73] Assignee: Dayco Corporation, Dayton, Ohio

[22] Filed: Jan. 5, 1972

[21] Appl. No.: 215,495

[52] U.S. Cl. .............................................. 305/38
[51] Int. Cl. ........................................... B62d 55/20
[58] Field of Search .................... 305/35 R, 36, 37, 305/38

[56] References Cited
UNITED STATES PATENTS

| 2,409,502 | 10/1946 | Leguillon | 305/36 |
| 2,040,696 | 5/1936 | Johnston | 305/37 |
| 3,674,322 | 7/1972 | Huber | 305/38 |
| 3,282,630 | 11/1966 | Harrison | 305/38 |
| 3,612,626 | 10/1971 | Fuchs | 305/38 |
| 3,285,676 | 11/1966 | Hetteen | 305/38 |

FOREIGN PATENTS OR APPLICATIONS
824,043   9/1969   Canada .............................. 305/38

Primary Examiner—Richard J. Johnson
Attorney—Reuben Wolk

[57] ABSTRACT

An endless track adapted to be moved in an endless path is provided and defined by a plurality of unique readily interlocked track sections. Each track section is comprised of a matrix-like body and a dual-purpose interlocking and reinforcing device embedded within the body with the device having at least one interlocking link with the link having exposed opposed end portions interlocked with cooperating end portions of links comprising adjoining track sections and the link having an opening therein which is adapted to receive therethrough an associated tooth of a drive sprocket used to drive the track.

4 Claims, 7 Drawing Figures

Patented July 24, 1973     3,747,996

TRACK SECTION AND ENDLESS TRACK USING SAME

BACKGROUND OF THE INVENTION

Endless tracks made of removable track sections and for use on tractors, snowmobiles, or the like, have been proposed heretofore. However, many of these previously proposed track sections and endless tracks defined thereby are generally deficient because they require numerous component portions in order to interlock the track sections together and define an endless track. Others of these previously proposed removable track sections are comparatively expensive, do not provide satisfactory lateral stability for their associated vehicles, and are often prone to excessive wear.

SUMMARY

This invention provides a self-contained track section of simple and economical construction and which may be readily interlocked with identical track sections to define an endless track for a tractor, snowmobile, or the like. Each track section is comprised of a matrix-like body and a dual-purpose interlocking and reinforcing device embedded within the body with the device extending substantially completely across the length of the track section. The device also has at least one interlocking link which has exposed opposed end portions which are adapted to be interlocked with cooperating end portions of links comprising adjoining track sections and each link has an opening therein which is adapted to receive therethrough an associated tooth of a drive sprocket used to drive the endless track.

Other details, uses, and advantages of this invention will be readily apparent from the exemplary embodiments thereof presented in the following specification, claims and drawings.

BRIEF DESCRIPTION OF THE DRAWING

The accompanying drawing shows present exemplary embodiments of this invention, in which.

DESCRIPTION OF ILLUSTRATED EMBODIMENTS

Figure 1:
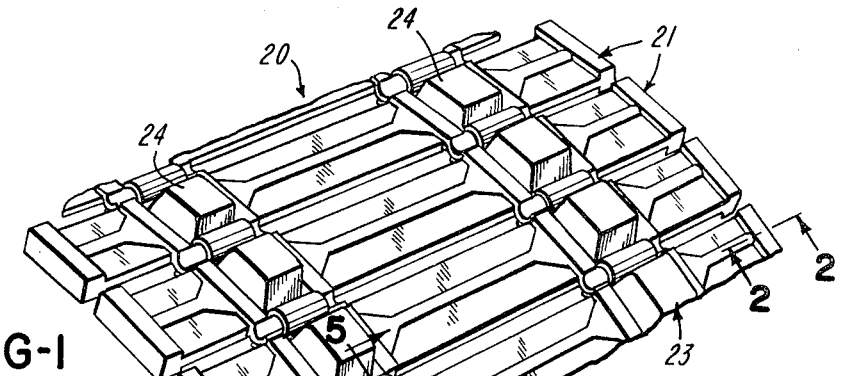
FIG. 1 is a fragmentary perspective view illustrating one exemplary embodiment of an endless track employing a plurality of identical interlocked track sections of this invention being driven by a sprocket wheel assembly having a plurality of two sprocket wheels.

Reference is now made to FIG. 1 of the drawing which illustrates one exemplary embodiment of an endless track of this invention which is designated generally by the reference numeral 20. The track 20 is defined by a plurality of identical track sections 21 which are readily interlocked together without requiring separate fastening or interlocking means or the like, whereby the track sections are essentially self-contained. The track 20 is particularly adapted to be used on a motor driven vehicle, such as a snowmobile, tractor, or the like, and having a driving sprocket assembly of standard construction for driving such track. The assembly comprises a plurality of two-sprocket wheels 23 fixed on a common driving shaft and having a plurality of circumferential equally spaced driving teeth 24 of known construction, and only portions of wheels 23 and teeth 24 comprising the driving sprocket assembly are shown in the drawing.

Figures 2, 3:
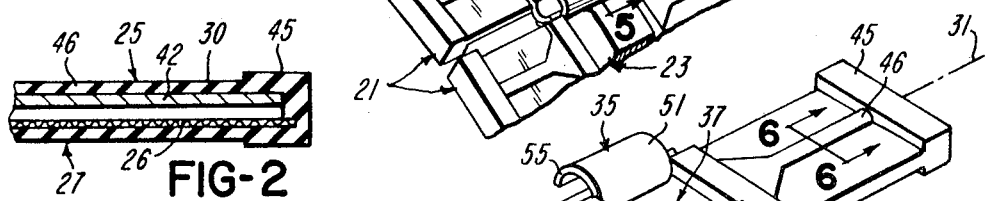
FIG. 2 is a cross-sectional view taken essentially on the line 2—2 of FIG. 1.
FIG. 3 is a perspective view illustrating an enlarged perspective view of a typical one of the track sections comprising the endless track of FIG. 1.
Figures 6, 7:
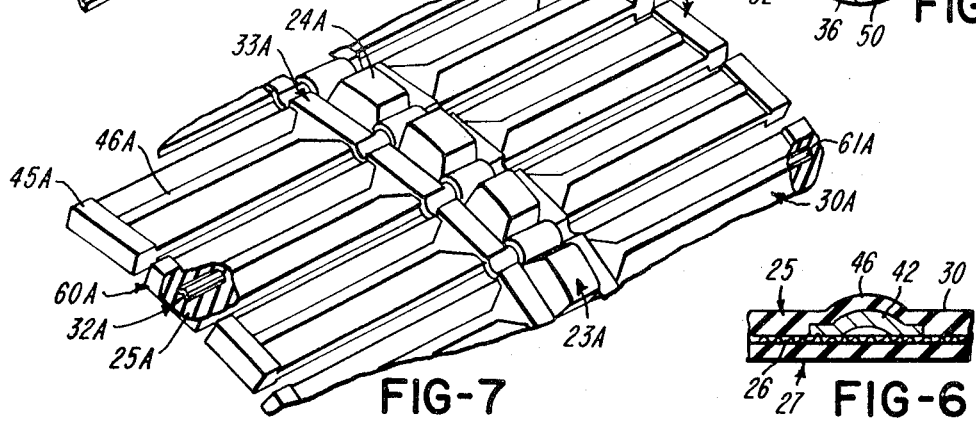
FIG. 6 is a fragmentary cross-sectional view taken essentially on the line 6—6 of FIG. 3.
FIG. 7 is a fragmentary, perspective view similar to FIG. 1 illustrating another exemplary embodiment of an endless track comprised of a plurality of identical track sections made in accordance with this invention, with the track sections of such endless track being driven by a single sprocket wheel.

The track section 21 comprises a matrix-like main body preferably made of an elastomeric material, see FIGS. 2, 3, and 6, such as natural or synthetic rubber, polyurethane, or the like, and the body 25 may include one or more layers of reinforcing material 26 such as a reinforcing fabric suitably embedded therein. Each track section 21 has a substantially smooth planar sprocket-engaging inside surface 27 and a ground-engaging surface 30 which will be described in detail subsequently.

The track section 21 has a substantially rectangular peripheral outline and a central longitudinal axis 31 and with the track sections 21 interlocked together to define the endless track 20, the track is moved in its endless path in a direction roughly perpendicular to the longitudinal axis 31 of each track section 21.

Figure 4:
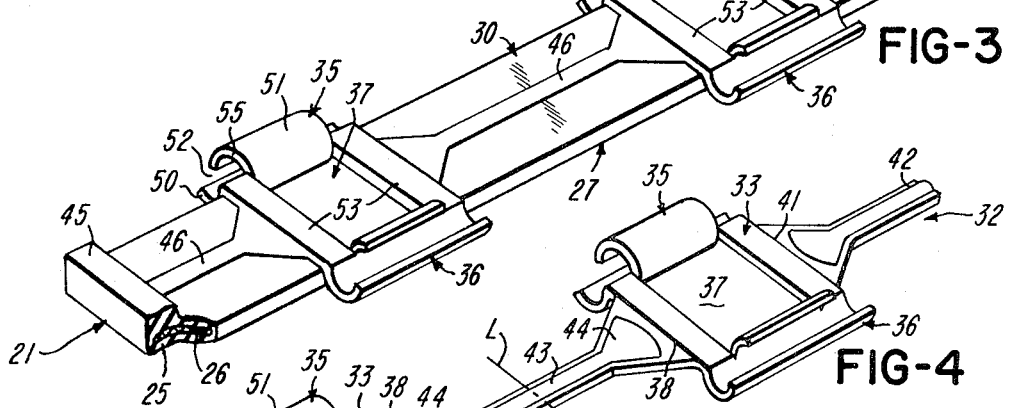
FIG. 4 is a perspective view illustrating a single piece dual-purpose interlocking and reinforcing device comprising the track section of FIG. 3.

The track section 21 has a substantially dual-purpose interlocking and reinforcing device 32 which is shown in FIG. 4 and device 32 is embedded within matrix-like body 25. The device 32 extends substantially completely across the length of the body 25 and roughly parallel to the longitudinal axis 31, also see FIG. 2.

The device 32 has at least one interlocking link provided as an integral part thereof and is made as a single piece construction and in this example such device 32 has a pair of self-sufficient links each designated by the reference numeral 33. Each link 33 has exposed opposed end portions 35 and 36 which are adapted to be interlocked with cooperating end portions of associated links comprising adjoining track sections and in a manner to be described in more detail subsequently, and the interlocking action is achieved solely by components of the associated links 33 without requiring additional components, or the like. Each link 33 also has an opening 37, of rectangular outline in this example, which is adapted to receive therethrough an associated sprocket tooth 24 of a drive sprocket 23 used to drive the endless track 20.

The integral links 33 have inner edges 38 (FIG. 4) interconnected by an integral connection 40 and outer edges 41 provided with integral extensions 42 whereby the device 32 has optimum structural strength. The connection 40 and extensions 42 may thus be considered as strengthening members which assure that their associated track section 21 and endless track has optimum lateral stability.

The integral connection 40 is in the form of a rod-like center portion 43 adjoined at its opposite ends by a pair of roughly trapezoidal transition portions 44. Each trapezoidal transition portion has the shorter of its parallel sides blending smoothly with the rod-like central portion 43 and has the longer of its parallel sides blending smoothly with an inner edge of an associated link 33.

The track section 21 has a plurality of cleats extending outwardly from its ground-engaging surface 30 and the cleats are adapted to provide more traction for the track section 21 and the endless track 20 defined by a plurality of sections 21. The cleats are best seen in FIG. 3 of the drawing and are made of the same elastomeric material used to make the body 25 and comprise a pair of integral cleats 45 extending outwardly from opposite end portions of the ground-engaging surface the the cleats 45 are arranged roughly perpendicular to th longitudinal axis 31. The cleats also include a plurality of three longitudinal cleats each designated by the same reference numeral 46 and the cleats 46 comprise integral projections of elastomeric material (see FIG. 6) arranged outwardly of and have a similar outline as the connection 40 and extensions 42 of device 32 aligned therebeneath. The end portions 35 and 36 of each link 33 may be made of any suitable configuration and it has been found that each link 33 may be made with optimum structural integrity yet made with maximum economy by making end portion 35 in the form of a longitudinally slotted configuration and the end portion 36 so that it is substantially semicylindrical. The semicylindrical end portion 36 has a radius which is smaller than the radius of end portion 35 and the wall thickness of each semicylindrical portion 36 is such that it is easily received within an associated end portion 35 and is freely rotatable therewithin. Because the links 33 comprising each track section 21 are identical a plurality of track sections 21 may be readily assembled merely by assembling each smaller radius semicylindrical portion 36 within the larger radius portion 35 and as will be described in detail subsequently.

The slotted tubular end portion 35 is defined by an arcuate (as viewed from an end thereof) portion 50 which has the same width as its associated link 33 and by an approximately semicylindrical portion 51 with a rectangular space or slot 52 provided therebetween. The slot 52 has a thickness which is greater than the roughly uniform thickness of the material used to make link 33 and for a purpose which will be apparent from the following description.

The assembly of a plurality of track sections 21 to define an endless track 20 may be easily accomplished merely by arranging the semicylindrical end portions 36 comprising the link of an unattached section 21 in axial alingment yet at a predetermined angle with the tubular portions 35 comprising the links of a previously installed track section, sliding each portion 36 axially relative to an associated portion 35 so that one side portion 53 of the unattached link is moved axially along the slot 52 until opposite side poritons 53 of the unattached link 33 are arranged outwardly of opposed ends of a semicylindrical portion 51 with portion 36 being arranged concentrically within portion 35. Once the end portions 36 of the links of an unattached track section 21 have been thus interlocked within associated end portions 35 of the links of a previously attached track section, the newly interlocked track section 21 is free to rotate relative to the previously installed track sections yet cannot be pulled apart by pulling a pair of track sections in the opposite direction substantially parallel to the endless path to be followed by the endless track 20, see FIG. 5. In addition, once the links are interlocked the end edges 55 of tubular portions 35 of a previously installed track section engage the inner edges of side portions 53 and prevent axial disassembly of track sections 21 with the endless track arranged in its normal endless path for normal operation.

Figure 5:
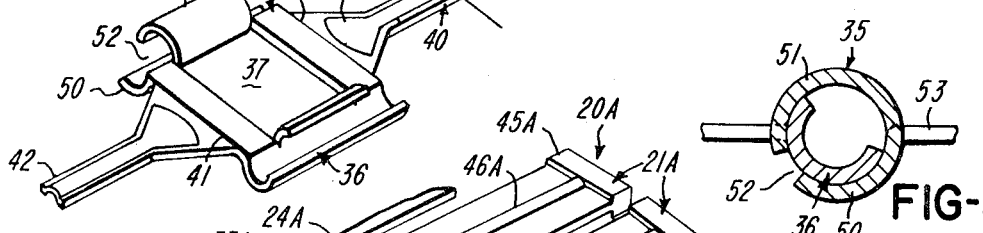
FIG. 5 is a fragmentary cross-sectional view taken essentially on the line 5—5 of FIG. 1.

The end portion 36 of each lind 33 is made so that it extends through an arc of 180° or greater, and the end portion 35 is made so that it extends through an arc of roughly 270° or more whereby as seen in FIG. 5, it is virtually impossible to pull apart the links 33 and hence the interconnected track sections 21.

Each end portion 35 and 36 of each link 33 is made so that it has a constant radius thereby lending itself to simple and economical manufacturing techniques and each link 33 is preferably made from a suitable metallic material with the end portion 35 being defined from a flat central strip of metal initially occupying at least a part of the space defined by an opening 37. This central strip is merely formed in a direction opposite its original position and has a width which is equal to the width of the opening 37. The arcuate portion 50 of end portion 35 has a width equal to the overall width of the link 33 and similarly the semicylindrical end portion 36 also has a width equal to the overall width of such link.

The endless track 20 is comprised of a plurality of interconnected track sections 21 as previously explained and each track section has a single-piece device 32 provided with a pair of spaced apart links 33 whereby the track 21 is driven by a sprocket wheel assembly having two sprocket wheels 23. However, it will be appreciated that each track section 21 may have a plurality of more than two integral links whereby it would be driven by a sprocket wheel assembly having a corresponding plurality of sprocket wheels.

The track section may also be provided with a single link in the center portion thereof and except for this difference such track section would be substantially identical to the track section 21 whereby a plurality of single link track sections each designated generally by the reference numeral 21A are shown interlocked together in FIG. 7 of the drawing so that these track sections 21A define an endless track 20A.

The endless track 20A is driven by a sprocket wheel assembly having only a single sprocket wheel 23A provided with sprocket teeth 24A and as seen at 60A in FIG. 7 each track section has a matrix-like main body 25A provided with the dual-purpose interlocking and reinforcing device 32A that is within the body and provided with a single interlocking link 33A. Basically the device 32A is substantially identical to a device 32 which has been cut along the dot-dash line L in FIG. 4 and the rod-like portions corresponding to protions 42 and 43 of the cut device made of extended length.

The extended length rod-like portions of device 32A are each designated by the reference numeral 61A and extend substantially across the full length of the track section 21A to thereby provide optimum lateral stability for the track section 21A and its associated track 20A. The track section 21A also has cleats 45A and 46A which are substantially identical to corresponding cleats 45 and 46 of section 21. The cleats 45A and 46A are provided as an integral part of the elastomeric material defining body 25A and extend outwardly from the ground-engaging surface 30A.

While present exemplary embodiments of this invention, and methods of practicing the same, have been illustrated and described, it will be recognized that this invention may be otherwise variously embodied and practiced within the scope of the following claims.

I claim:

1. An endless track adapted to be moved in an endless path and being defined by a plurality of readily interlocked track sections; each of seaid track sections comprising a matrix-like body having a ground-engaging surface and made of elastomeric material and having a dual-purpose interlocking and reinforcing device embedded within said body; each of said devices being of a single piece construction having first and second spaced links with exposed opposed end portions interlocked with cooperating end portions of similar links in adjoining track sections; each of said links having inner edges interconnected by an integral connection and outer edges provided with integral extensions so that said connections and extensions provide lateral stability for their associated section and said track; said integral connections being in the form of rod-like central portions adjoined at their opposite ends by a pair of roughly trapezoidal transition portions having the shorter of its parallel sides blending smoothly with said rod-like portion and the longer of its parallel sides blending smoothly with an associated link; said links having openings therein adapted to receive an associated tooth of a drive sprocket used to drive said track.

2. A track as set forth in claim 1 and further comprising a plurality of cleats extending outwardly from said ground-engaging surface, said cleats being adapted to provide more traction for their track section and associated endless track.

3. A track as set forth in claim 2 in which said cleats are provided as an integral part of said matrix-like body and are made of the same material.

4. A track as set forth in claim 2 in which said matrix-like body has a roughly rectangular peripheral outline and is made of an elastomeric material and said cleats comprise a pair of integral cleats made of said elastomeric material, said pair of cleats extending outwardly from opposite end portions of said ground-engaging surface and roughly perpendicular to said longitudinal axis.

* * * * *